United States Patent [19]

Sanders

[11] Patent Number: 5,457,908

[45] Date of Patent: Oct. 17, 1995

[54] BRINE SHRIMP EGG HARVESTING DEVICE

[76] Inventor: Bruce C. Sanders, 838 W. 3900 South, Ogden, Utah 84405

[21] Appl. No.: 333,272

[22] Filed: Nov. 2, 1994

[51] Int. Cl.$^6$ ............................................. A01K 79/00
[52] U.S. Cl. ................... 43/6.5; 210/242.1; 56/9
[58] Field of Search .................. 43/6.5; 210/776, 210/923, 242.1, 242.3; 56/8, 9

[56] References Cited

U.S. PATENT DOCUMENTS

| | | | |
|---|---|---|---|
| 3,762,558 | 10/1973 | Anderson | 210/776 X |
| 3,768,193 | 10/1973 | London | 43/6.5 |
| 4,839,062 | 6/1989 | Sanders | 210/776 |
| 4,998,369 | 3/1991 | Lamon | 43/6.5 |
| 5,042,187 | 8/1991 | Bentzley | 43/6.5 |

FOREIGN PATENT DOCUMENTS 2229260  12/1974  France ................... 210/923

Primary Examiner—P. Austin Bradley
Assistant Examiner—Jeanne M. Elpel
Attorney, Agent, or Firm—Madson & Metcalf

[57] ABSTRACT

A brine shrimp egg harvesting device is shown. The harvesting device includes wedge-oriented booms designed to concentrate the brine shrimp eggs which float at the surface of a body of water. The brine shrimp egg harvesting device also has a collector for removing the concentrated slurry of brine shrimp eggs from the water and depositing it in a collection tank. The collector comprises of scoops which may be attached to drive chains which rotate the scoops into and out of the water. As the scoop enter the water, they trap a portion of the concentrated brine shrimp eggs and water and convey the captured slurry to a collection tank for deposit. The brine shrimp egg harvesting device has a pumping system for transporting the slurry of brine shrimp eggs and water from the collection tank to one or more porous storage containers which filter out the water in the slurry.

20 Claims, 6 Drawing Sheets

BRINE SHRIMP EGG HARVESTING DEVICE

BACKGROUND

1. The Field of the Invention

The present invention is related to a brine shrimp egg harvesting device. More particularly, the present invention is directed to a brine shrimp egg harvesting device which efficiently harvests brine shrimp eggs while causing only minimal disturbance to the surface of the water in which the eggs float.

2. Technical Background

Brine shrimp are primitive crustaceans which normally inhabit bodies of water having high saline contents such as the Great Salt Lake in Utah. They serve as a source of food for many fish. Brine shrimp eggs are remarkable in that they can be dried, stored, and hatched years later by returning them to salt water. The ability to stockpile dried brine shrimp eggs for future hatching makes commercial harvesting of the eggs a profitable venture.

Brine shrimp and their eggs conglomerate in floating colonies at the surface of the water. Brine shrimp colonies typically occupy the top quarter-inch of water. The eggs are extremely small in size, such that an ounce of water may contain several million eggs. This floating layer is eventually carried by the wind and the tide to the shore.

Prior harvesting approaches have focused on collection after the eggs had been deposited on the shore. Nets or shovels were used to scoop up the thin layer of shrimp eggs and place them into storage containers. This approach was far from effective, however, as the harvester had to depend on the wind and the tide to bring the eggs ashore. Thus, the harvester had no control over when or where the eggs would be deposited.

To deal with the problem of unpredictability, elaborate fencing structures were erected, extending outwardly from the shoreline, to direct incoming shrimp colonies to preselected harvesting sites on the beach. While noticeably more effective in concentrating colonies at predetermined sites, this method was not, however, without its disadvantages. As an initial problem, these extensive fencing structures were understandably expensive. Additionally, this method required that the harvester have access to large areas of shoreline. Finally, the harvester still, had to wait for the right wind and tide conditions to bring the shrimp eggs ashore.

Because of the disadvantages inherent in shoreline harvesting methods, increasing attention has been directed toward methods for harvesting brine shrimp eggs directly from the water. Such methods usually employ a boat or raft equipped with a collection device.

Previous attempts to harvest brine shrimp eggs directly from the water have utilized an assortment of nets or screening devices to skim the eggs from the surface of the body of water. The collected eggs were then transferred from the nets or screens and into storage containers. U.S. Pat. No. 3,768,193 by London and U.S. Pat. No. 5,042,187 by Bentzley are two examples of prior art devices which utilize a netting device to collect brine shrimp eggs from a water surface.

There are a number of problems, however, with devices employing netting or screening procedures to remove brine shrimp eggs from water. As an initial matter, netting or screening is generally inefficient because of the very small size of the eggs. With a concentration typically of several million eggs in a single ounce of water, one can easily imagine how great numbers of the eggs pass through conventional net systems avoiding capture. As the netting or screening device becomes finer and finer, to increase the extraction efficiency of brine shrimp eggs from the water, additional problems arise. It has been found that eggs cling together and solidify when concentrated, thereby becoming very difficult to remove from the netting.

Because of the problems inherent in extracting brine shrimp eggs by netting procedures, attempts have been made to scoop up the top layer of water containing the brine shrimp eggs using a conveyor belt system. U.S. Pat. No. 5,042,187 by Bentzley discloses one such method for harvesting brine shrimp eggs. In Bentzley, a conveyor belt is fitted with a plurality of net-fitted frames. The belt system is angled with a low end in the water adjacent the concentrated brine shrimp eggs and a high end out of the water over a collection bin. The belt system rotates the frames such that the frames enter the water underneath the belt system, traveling toward the oncoming brine shrimp eggs. As the netted frames round the low end, they lift a sample of brine shrimp eggs and water. Once the frames round the high end, the brine shrimp eggs fall out of the netting into the collection bin. One difficulty with the Bentzley device is the same with most brine shrimp egg netting devices; once a portion of the water drains out of the netting the eggs have a tendency to conglomerate making it difficult to remove them from the netting.

Another problem with the Bentzley device is the disturbance and agitation of the brine shrimp eggs during harvesting. If the method of harvesting disperses or causes the colony of brine shrimp eggs to sink the harvest will be less efficient. Water disturbance results in part from the direction of the netted frames around the belt system. Disturbance also results when the device used for gathering up a portion of brine shrimp eggs has flat surfaces that splash into the water.

In the Bentzley device, the concentration mechanism causes brine shrimp to flow towards the conveyor belt affixed with the netted frames. The netted frames rotate about the conveyor belt in a direction which causes the brine shrimp eggs and water to flow in the opposite direction as the flow established by the concentration mechanism. As these flows collide at the surface of the water, brine shrimp eggs floating at the point of collision are dispersed and forced below the water surface. This negatively affects the efficiency of the harvesting operation.

Conventional conveyor systems are sometimes affixed with paddles which guide a quantity of brine shrimp eggs into a collection device. The flat surface area of the paddle tends to splash down onto the water as opposed to gradually knifing through it. When flat surfaces enter the brine shrimp colony, the disturbance in maximized. This disturbance in the brine shrimp colony negatively affects the efficiency with which the brine shrimp eggs are removed from the water.

It will be appreciated, that it would be an advancement in the art to provide a brine shrimp egg harvester which could extract a sample of brine shrimp eggs and water from the water surface, without disturbing the flow of brine shrimp eggs into the device. It would be a further advancement in the art to provide a brine shrimp egg harvester which can extract a relatively uniform ratio of eggs to water to allow for a pumpable slurry. Finally, it would be another advancement in the art to provide a device that performs these functions in an efficient, cost-effective, commercial manner.

Such a brine shrimp egg harvester is disclosed and claimed herein.

BRIEF SUMMARY OF THE INVENTION

The present invention is directed toward a novel brine shrimp egg harvesting device. The device preferably concentrates brine shrimp eggs which float at the surface of a body of water to affect more efficient harvesting. The device also has a collector for removing the concentrated mixture of brine shrimp eggs and water, or slurry of brine shrimp eggs, from the water surface and depositing the slurry in a collection tank. The device has a pumping system for transporting the slurry of brine shrimp eggs from the collection tank to one or more porous storage containers which retain the eggs, but allow water to drain out of the container.

As just mentioned, the brine shrimp egg harvesting device has means for concentrating the brine shrimp eggs which float at the water surface. Concentrating the brine shrimp eggs before removing them from the water increases harvesting efficiency and production. The eggs are preferably concentrated by a channeling structure having diverging, wedge-oriented booms. The booms are configured such that the channel has a wide forward end and a narrow rearward end. As the booms move forward in relation to the floating brine shrimp eggs, the eggs are preferably received into the wide forward end and channeled into an increasingly narrow space until they are concentrated at the rearward end of the channeling structure.

The collector portion of the brine shrimp egg harvester removes quantities of concentrated brine shrimp eggs and water from the water surface. The collector includes a conveyor system and a collection tank. The conveyor system has an inlet end which extends into the body of water adjacent to the concentrated floating brine shrimp eggs. The conveyor system also has an outlet end extending out of the water above the collection tank.

The conveyor system includes rigid impermeable scoops connected to a drive mechanism. The drive mechanism is positioned between the inlet and outlet ends of the conveyor system. The drive mechanism preferably includes a plurality of aligned sprocket sets with an endless chain trained around each set of aligned sprockets. One or more sprockets is preferably connected to a motor which powers the sprocket/chain assembly. The scoops are affixed substantially perpendicular to the drive mechanism chains and travel around the drive mechanism in a substantially oval path.

The direction in which the drive mechanism directs the scoops into and out of the water plays an important role in minimizing the disturbance of the floating colony. The scoops enter the water at the inlet end. Each scoop traps a quantity of brine shrimp eggs and water. As the scoops rotate beneath the drive mechanism, they engage a partially submerged ramp positioned between the inlet and outlet ends of the conveyor system, underneath the drive mechanism. Each scoop drags a slurry of brine shrimp eggs up and out of the water toward the collection tank along the ramp. The ramp ends at, and is affixed to the top front edge of the collection tank. As each scoop reaches the collection tank the scoops pass beyond the ramp and disengage causing the contained brine shrimp eggs and water to fall into the collection tank. Shortly thereafter, each scoop travels around the outlet end to the top of the drive mechanism and starts its descent towards the water. Thus, the drive mechanism directs the scoops into and out of the water such that there is continuous uninterrupted flow of brine shrimp eggs through the concentrating device and conveyor system, all the way to the collection tank. A back flow, which could disperse the concentrated brine shrimp eggs to an unacceptable or unreachable depth in the water, is avoided by the direction of rotation of the drive mechanism chains.

The shape of each conveyor system scoop is important to reducing the disturbance of the brine shrimp colony during harvesting. Each scoop is preferably configured and attached to the drive mechanism such that thin edges as opposed to flat surface penetrate the water. The curvature of each scoop allows the scoop to knife into the water, gradually separating a portion of brine shrimp eggs from the rest of the colony without churning up the water.

It is commercially important that the shrimp not be damaged when harvested. Each scoop has an outer longitudinal edge affixed with a flexible material. This material engages the partially submerged ramp as the scoop travels around the inlet end. The flexible material allows the scoop to maintain constant uniform contact with the ramp. This prevents the brine shrimp eggs from escaping back down the ramp into the water. The flexible material allows for increased efficiency without damaging the brine shrimp eggs.

As mentioned above, the collector of the brine shrimp egg harvester has two components, the conveyor system, discussed just previously, and the collection tank. The collection tank is preferably rigidly affixed to the conveyor system, but it may be affixed to the conveyor system with a flexible hinge. The collection tank has at least one drain disposed within it adjacent the lowest point of the collection tank. This allows the accumulated slurry of brine shrimp eggs and water to flow through the drain by the force of gravity. The drain may be connected to a conduit which, by means of a pumping system, transports the slurry of brine shrimp eggs and water to the porous storage containers mentioned above.

The brine shrimp collector may be adjusted so that scoops enter the water at various preselected depths or angles. The brine shrimp collector is preferably pivotally mounted to a frame toward the outlet end of the conveyor system. The entire collector including conveyor system and collection tank may be pivoted by means of at least one electric or hydraulic ram. One end of the ram is connected to the frame and the other end to the collection tank. As the ram forces the collection tank down, the inlet end, located on the other side of the pivot point, pivots upward in relation to the water.

Not only is the entire collector pivotally adjustable, but by means of at least two other hydraulic or electric rams, either or both sides may be raised or lowered. The sides of the collector are movably secured to the frame. An electric or hydraulic ram is preferably attached to each side of the collector such that the height of one or both sides of collector may be adjusted within the frame.

Finally, the brine shrimp egg harvester preferably has a pumping system which pumps the collected slurry of brine shrimp eggs and water from the collection tank to one or more porous storage containers. The porous storage containers allow water to drain out while containing the brine shrimp eggs.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
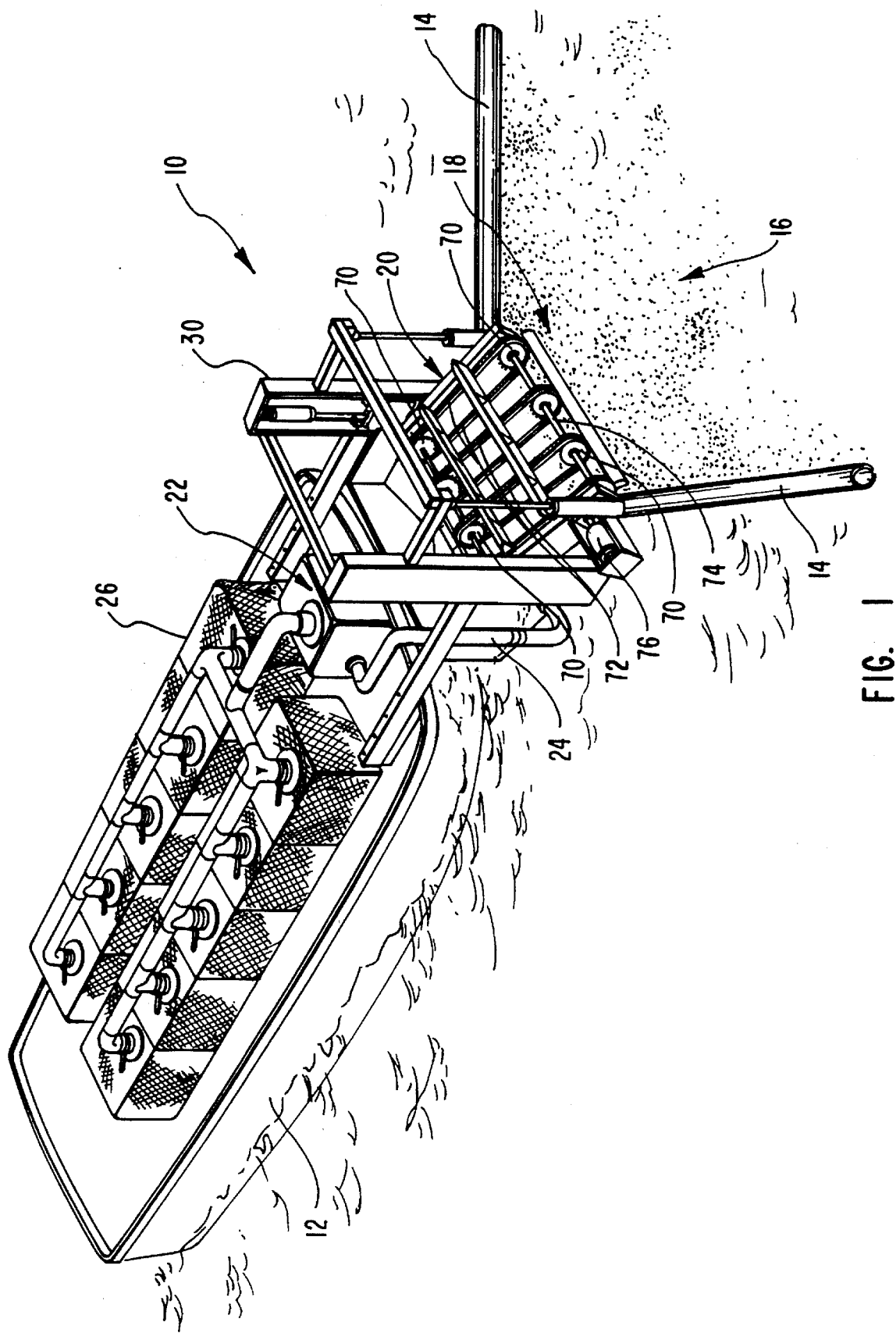
FIG. 1 is a perspective view of the brine shrimp egg harvesting device attached to a harvesting boat.

Reference is now made to the figures wherein like parts are referred to by like numerals throughout. With particular reference to FIG. 1, a brine shrimp egg harvesting device according to the present invention is generally designated at 10.

The device 10, is attached to a harvesting boat 12. One with skill in the art will appreciate that this invention can be practiced using a variety of floatation devices. The device 10 includes means for concentrating brine shrimp eggs which float at the surface of a body of water. In a presently preferred embodiment, the concentrating means includes wedge-oriented booms 14 which extend away from the device 10. The booms 14 define a wide forward end 16 and a narrow rearward end 18. As the booms move forward in relation to the floating brine shrimp eggs, the eggs are received into the wide forward end 16 and channeled into an increasingly narrow space until they are concentrated at the rearward end 18, defined by booms 14. It will be appreciated that there are many ways in which to move the booms 14 forward in relation to the floating brine shrimp, including, but not limited to, using the forward motion of the boat 12, or equipping each boom 14 with its own motor.

The brine shrimp egg harvesting device 10, includes a collector 20 for removing and collecting brine shrimp eggs from the surface of the water. The brine shrimp collector 20 is pivotally mounted to a frame 30 connected to the boat 12. The booms 14 are connected to the sides of the frame 30.

FIG. 1 also illustrates a pumping system 22. The pumping system is in fluid communication with the collector 20 via a conduit 24. The pumping system 22 pumps a collected slurry of brine shrimp eggs to at least one porous storage container 26. In the embodiment illustrated in FIG. 1, several porous storage containers are illustrated.

Figure 2:
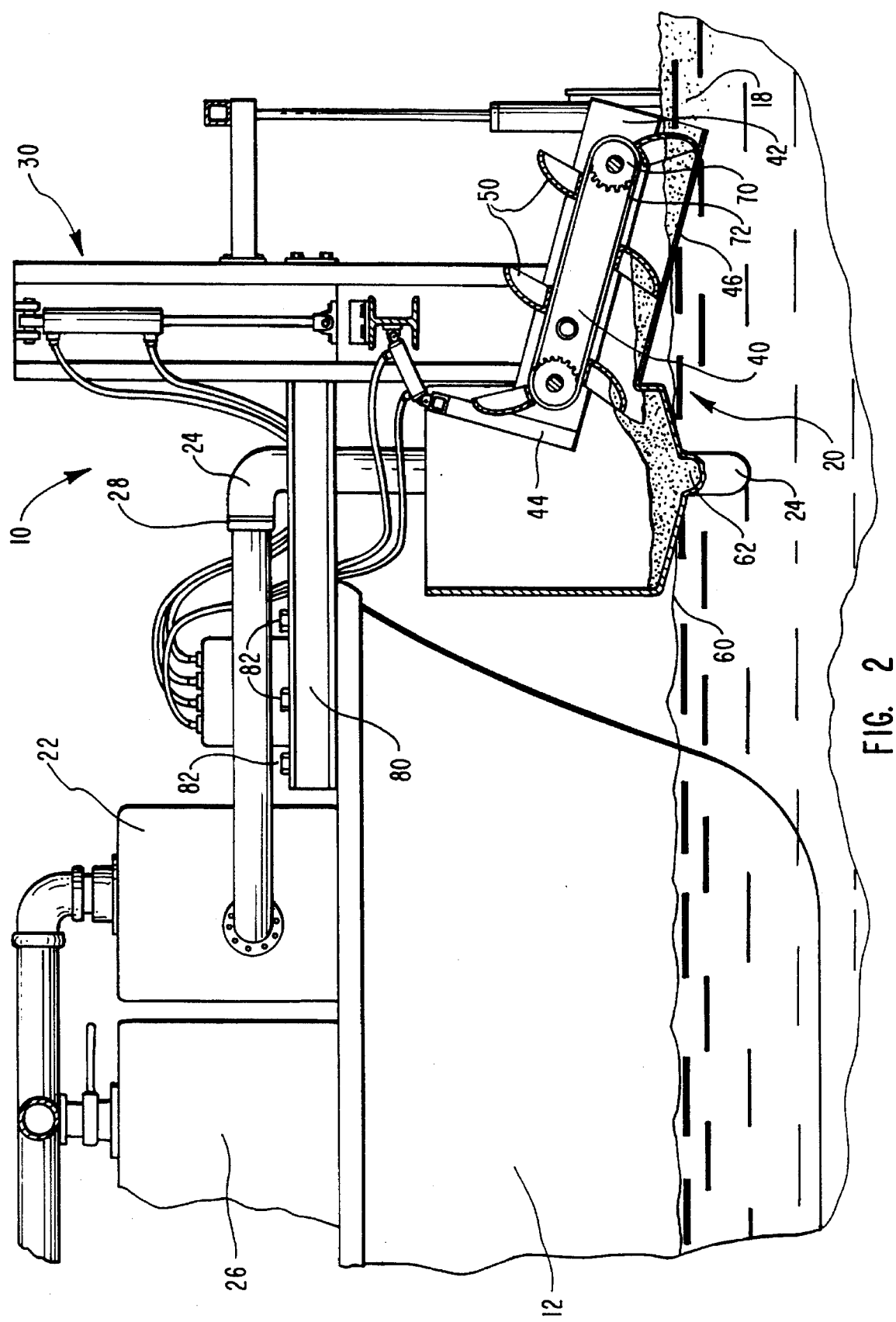
FIG. 2 is a side plan view of one embodiment of the brine shrimp egg harvesting device.

As can best be seen in FIG. 2, the collector 20 includes a conveyor system 40, and a collection tank 60. The conveyor system 40 has an inlet end 42 extending into the water adjacent the concentrated layer of brine shrimp eggs floating at the narrow rearward end 18 of the wedge-oriented concentrating booms 14. The conveyor system 40 also has an outlet end 44 extending above the water. A ramp surface 46 is located between the inlet end 42 and the outlet end 44. The conveyor system is powered by a drive mechanism.

With reference again to FIG. 1, the drive mechanism of the preferred embodiment is comprised of a plurality of aligned sprockets 70 with an endless chain 72 trained around each set of aligned sprockets 70. One or more sprockets may be connected to a drive shaft 74 which rotates the sprocket/chain assembly. In a currently preferred embodiment, four pairs of aligned sprockets 70 are used with four chains.

There is one drive shaft in the preferred embodiment which is connected to a motor 76. As illustrated in FIG. 1, the chains 72 travel around the inlet end 42 and the outlet end 44 of the conveyor system 40 in a substantially oval path. One with skill in the art will appreciate that different chain/sprocket assemblies may be used to practice the teachings of this invention. Additionally, a variety of drive mechanisms may be used. For example, the drive mechanism could be comprised of a pair of drums with a belt trained about the drums.

With reference back to FIG. 2, the conveyor system 40 includes a plurality of rigid impermeable scoops 50 which are connected to the drive mechanism chains 72. The scoops 50 are generally perpendicular to the chains 72. The scoops 50 face in the same direction and continually rotate around the inlet end 42 and the outlet end 44 of the brine shrimp conveyor system 40.

The conveyor system 40 operates such that the drive mechanism chains 72 rotate the attached scoops 50 into and out of the water. The scoops 50 enter the water as they rotate down around the inlet end 42, trapping a slurry of brine shrimp eggs and water. Each scoop 50 then engages the ramp 46 which is positioned underneath the drive mechanism and is partially submerged. Each scoop 50 drags the slurry up and out of the water toward the collection tank 60 along the underneath side of the drive mechanism. Once each scoop 50 enters the water, it travels in the same direction as the incoming concentrated brine shrimp eggs. As each scoop 50 reaches the collection tank 60 the scoops 50 disengage the ramp 46 and gravity causes the contained brine shrimp eggs and water to be deposited into the collection tank 60. Each scoop 50 then travels around the outlet end 44 to the top of the drive mechanism and starts its descent towards the water at the inlet end 42. The collector 20 is configured to facilitate the continuous uninterrupted flow of brine shrimp eggs through the concentrating booms 14 and collector 20, all the way to the collection tank 60. This configuration prevents a back flow which could disperse the concentrated brine shrimp eggs to an unacceptable or unreachable depth in the water.

Figure 3:
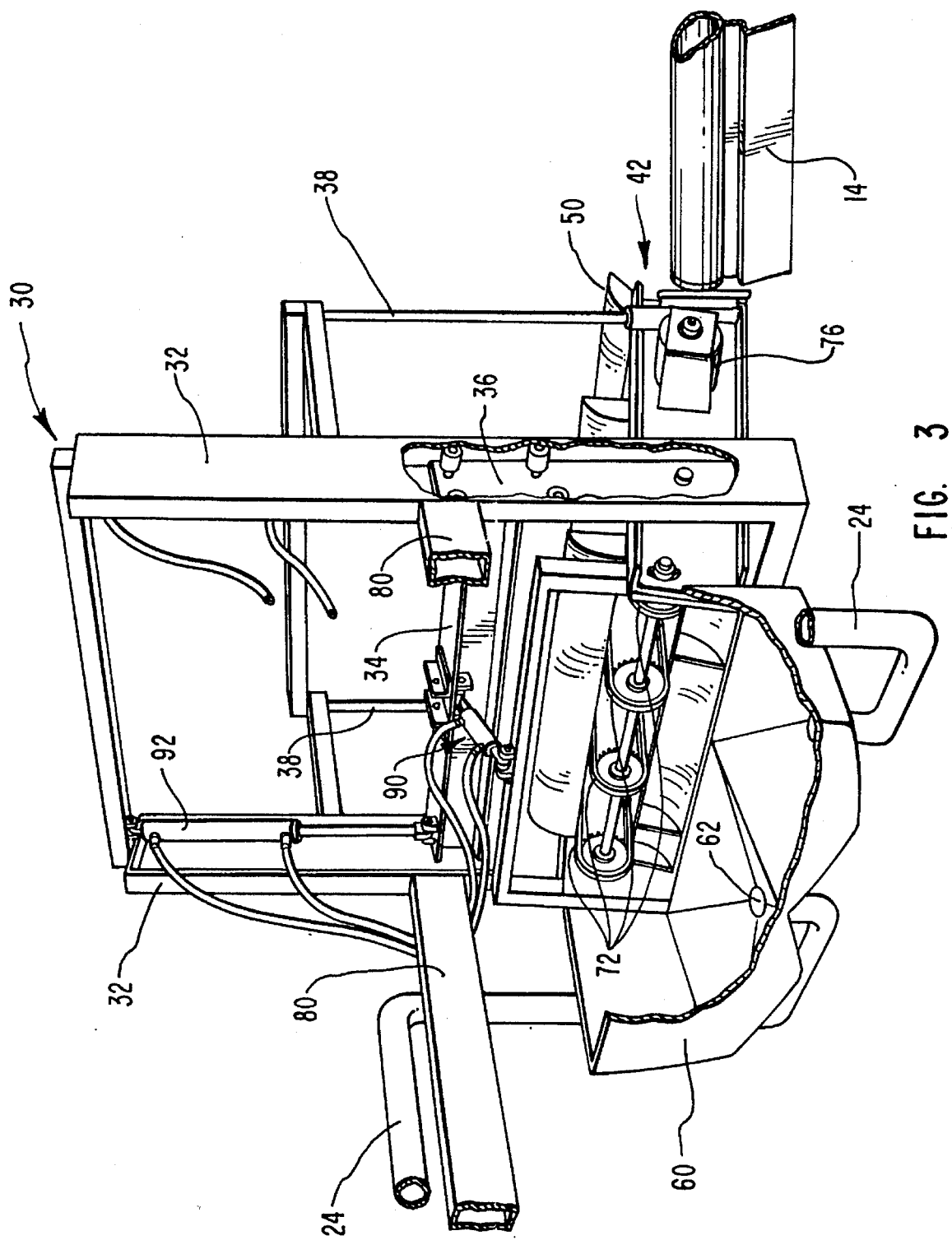
FIG. 3 is a partial cutaway perspective view of collector portion of the brine shrimp egg harvesting device.
Figure 5:
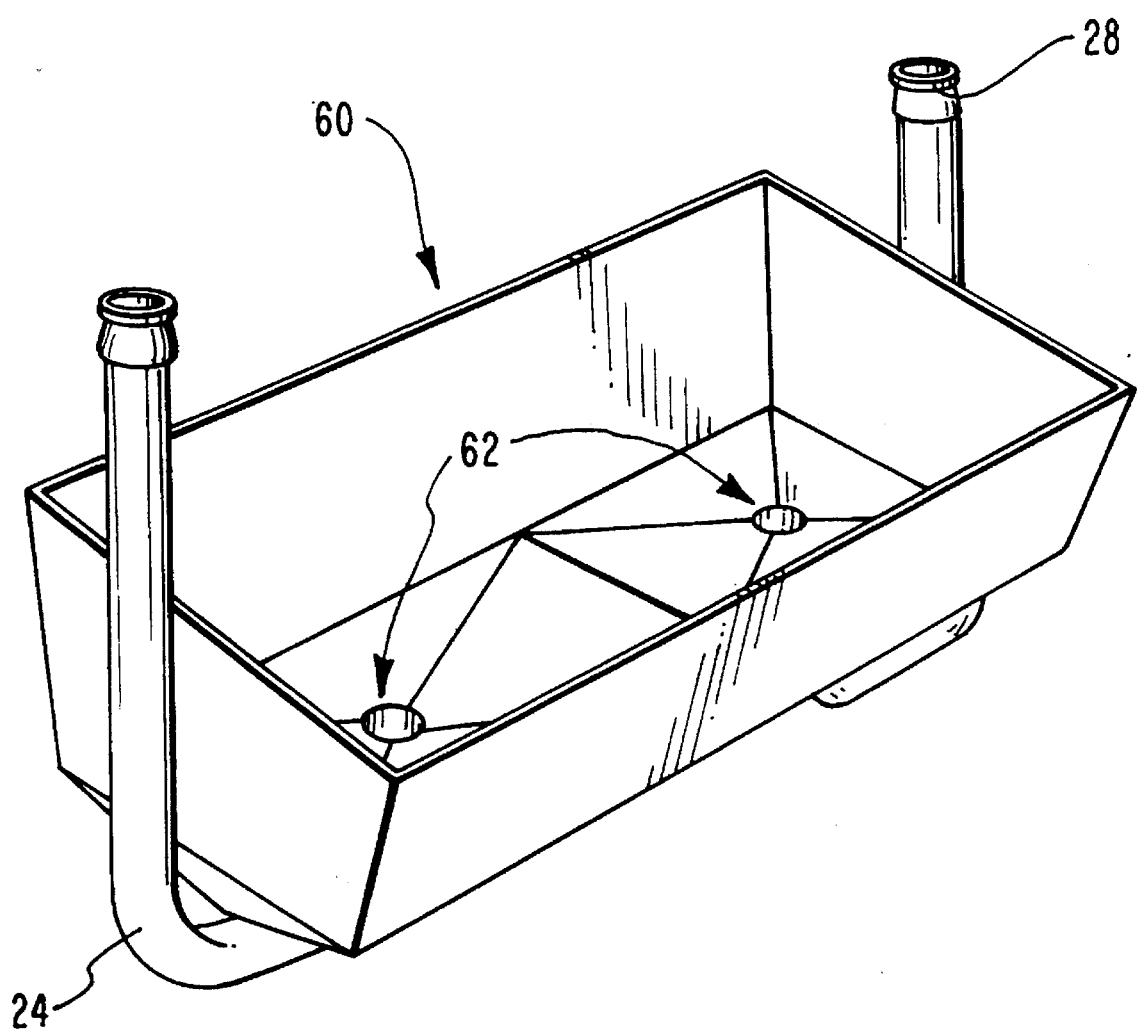
FIG. 5 is a perspective view of the collection tank.

With reference still to FIGS. 2, 3, and 5, the collection tank 60 is connected to the conveyor system 40 adjacent the outlet end 44. The collection tank 60 has at least one drain 62 disposed at the lowest point of the collection tank 60. In a preferred embodiment, the collection tank 60 has two drains 62. Each half of the holding tank is beveled to simulate a funnel into which the collected slurry of brine shrimp eggs and water flow by the force of gravity. Two conduits 24 connect to the drains 62 and extend upwards by the side of the collection tank 60. The couplings 28 in the embodiment illustrated in FIG. 5 are positioned just above the upper edge of the collection tank 60.

It will be appreciated that the teachings of this invention may be practiced using a variety of shapes of collection tanks, with openings or drains disposed in various places. For example, the bottom of the tank may beveled to funnel the collected slurry of brine shrimp eggs and water to the back or side of the collection tank 60. The drain 62 could then be disposed in the back or side of the tank, adjacent the lowest point. The conduits 24 may also extend out of the water in a variety of ways.

FIG. 2 illustrates the conduit 24 which transports the slurry of brine shrimp eggs and water from the collection tank 60 to the porous storage containers 26, by means of the pumping system 22. The conduit 24 has a coupling 28 which allows the pumping system 22 to be detachably connected to the conduit 24. A pair of beams 80 and a series of bolts 82 are used in the preferred embodiment to secure frame 30 to the boat 12. The bolts 82 are easily removable and the conduit 24 can be separated at the coupling 28 allowing the frame to completely detach from the boat. This allows for easy storing and better boat maneuverability. It will be appreciated that a variety of support or attachment mechanisms may be used to secure the collector 20 to the boat 12.

With reference now to FIG. 3, the frame 30 has two substantially vertical and parallel sides 32. A substantially horizontal cross beam 34 is positioned between each side 32. A movable panel 36 is attached to each end of the cross beam 34. The collector 20 is pivotally mounted to said panels 36. The panels 36 are movably secured within each frame side 32. The frame 30 also has forward support poles 38 adjacent the inlet end 42 of the conveyor 40. Each side of the inlet end 42 of the conveyor system 40 is movably secured to a support pole 38.

FIG. 3 illustrates the adjustability of the collector 20 in relationship to the water. The collector 20, which is comprised of the conveyor system 40 attached to the collection tank 60, is capable of pivotal adjustment within the frame 30. A hydraulic pivot ram 90 is connected at one end to the middle of the cross beam 34, and at the other end to a support structure located at the outlet end 44 of the conveyor system 40. The collector 20 is positioned within the frame 30 such that as the outlet end 44 of the conveyor system 40 is forced downward by the pivot ram 90, the inlet end 42 pivots upward in relation to the water.

Each end of the cross beam 34 illustrated in FIG. 3 is capable of independent height adjustment. Each end of the cross beam is preferably connected to hydraulic ram 92. Each end ram 92 can raise or lower an end of the cross beam 34 independently or in concert. This adjustability allows the user to adjust the collector to the optimal position for efficient harvesting. It will be appreciated that various configurations of electric or hydraulic rams not illustrated in the figures may be used to adjust the brine shrimp egg harvesting device in relation to the water surface.

Figure 4:
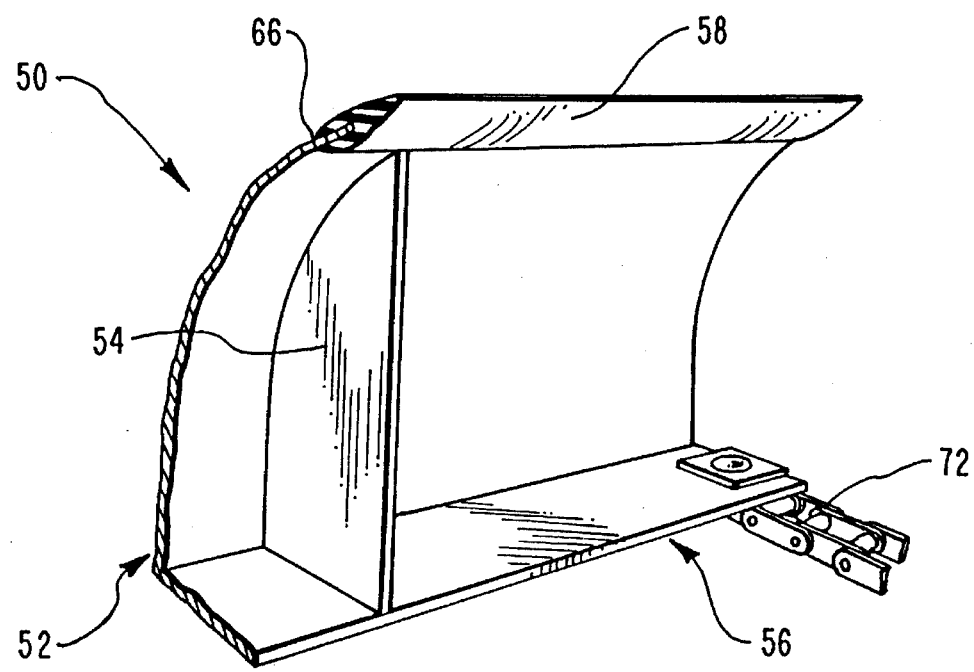
FIG. 4 is a perspective view of a portion of the scoop.

FIG. 4 illustrates a currently preferred shape and configuration of scoop 50. Each scoop has a cavity defined by a generally concave trough 52 running the length of the scoop and at least two cross panels 54 configured generally perpendicular to the trough 52. Each trough 52 has an inner longitudinal edge 56 and an outer longitudinal edge 66. The inner longitudinal edge 56, the outer longitudinal edge 66, and the ends of at least two cross panels 54 define at least one opening in the scoop cavity.

Each scoop 50 is preferably connected to the drive mechanism chain 72 such that the inner longitudinal edge 56 is positioned adjacent to the drive mechanism, and the outer longitudinal edge 66 is positioned away from the drive mechanism. Each outer longitudinal edge 66 is configured with a flexible material 58. In a preferred embodiment, the flexible material is a type of rubber. One will appreciate that a variety of flexible materials may be used to accomplish the teachings of this invention. These might include composite materials, plastics, or various types of rubbers.

With reference to FIG. 2, the scoops 50 are connected to the drive mechanism such that the drive mechanism rotates each connected scoop 50 down into the water at the inlet end 42. The cavity opening of each scoop 50 enters the water before the rest of the scoop such that a slurry of brine shrimp eggs and water is entrapped in the cavity. As the scoop 50 and the outer longitudinal edge 66 travel around the inlet end 42 of the conveyor system 40, the flexible material 58 of the outer longitudinal edge 66 engages the ramp 46. This allows uniform contact between the scoop 50 and the ramp 46 to be maintained.

Figure 4A:
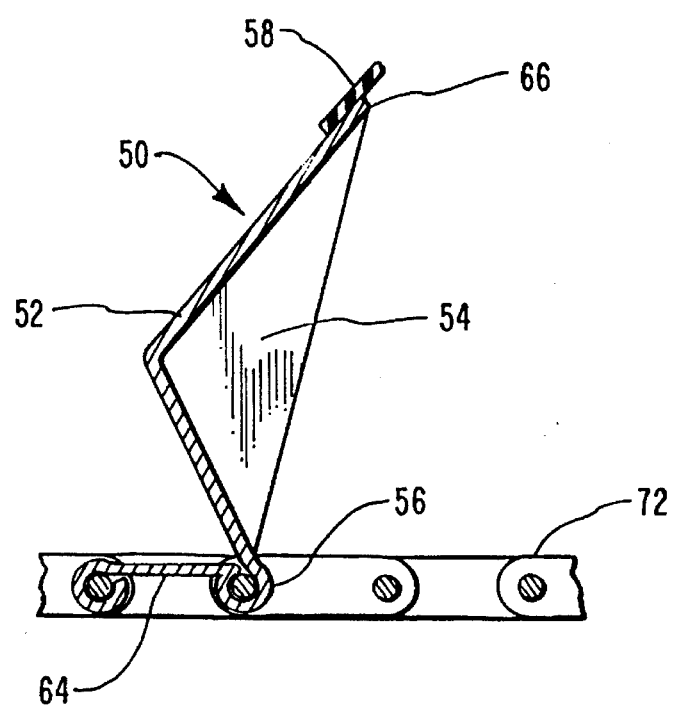
FIG. 4a is a side plan view of an alternative embodiment of the scoop.

FIG. 4a illustrates an alternative embodiment of the scoop 50. The trough 52 has more of an angular shape. The scoop 50 illustrated in FIG. 4a has a section 64 which connects to the drive mechanism chain 72. Unlike the scoop 50 illustrated in FIG. 4, where a portion of the concave trough 52 is connected to the drive mechanism chain 72, the scoop 50 has a section 64 whose function is dedicated solely to attachment to the drive mechanism chain 72. One with skill in the art will appreciate that the scoop 50 may be configured with varying shapes of cavity. The trough 52 may be semicircular and may not be of uniform shape throughout the scoop 52. Additionally, the cross-panels 54 need not be parallel to each other or perpendicular to the trough 52. It will be appreciated that cross-panels 54 are not necessary if the conveyor system 40 is configured with sides such that the longitudinal ends of the scoops 50 is preferably in contact with the side of the conveyor system 40 allowing containment of a quantity of brine shrimp eggs. The shape need only be such that as the scoop enters the water, it collects a quantity of brine shrimp eggs with minimal disturbance to the water.

Figure 6:
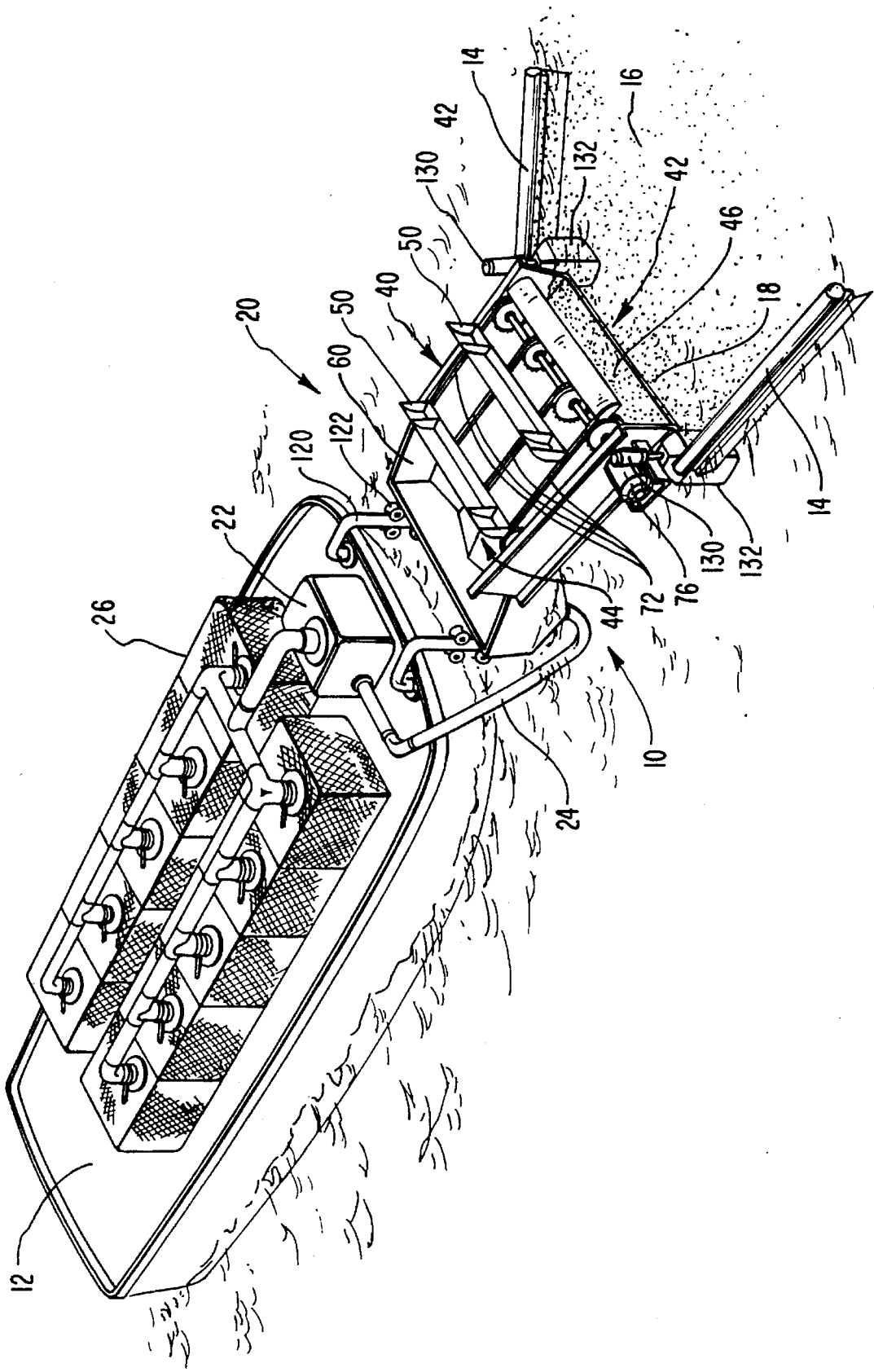
FIG. 6 is a perspective view of an alternative embodiment of the brine shrimp egg harvesting device attached to a harvesting boat.

FIG. 6 illustrates an alternative embodiment of the brine shrimp egg harvesting device 10. In the illustrated embodiment, collector 20 has a slightly different structure. The conveyor system 40 is not rigidly connected to the collection tank 60. The collection tank 60 is movably secured to the boat 12 by a set of pipes 120 and a roller assemblage 122. It will be appreciated that the tank 60 may be connected to the boat 12 in a variety of ways. The end of the ramp 46 adjacent the outlet end 44 of the conveyor system 40 is hinged to the top front edge of the collection tank. The inlet end 42 of the conveyor system 40 is connected to a pair of floats 132 via hydraulic rams 130. This allows the inlet end 42 to float freely in the water providing a self adjustment mechanism. The hydraulic rams 130 allow the user to manually adjust the depth of the inlet end 42 in relation to the water. The concentrating booms 14 are movably connected to the flotation devices 132.

The problems of conventional devices have been addressed by the teachings of this invention. The brine shrimp egg harvester disclosed herein extracts a sample of brine shrimp eggs and water from the water surface, without disturbing the flow of brine shrimp eggs into the device. The brine shrimp egg harvester can be adjusted in various ways to control ratio of eggs to water in the harvest allowing for a pumpable slurry and increased efficiency. Finally, the brine shrimp egg harvester is compact, detachable and easy to use. It provides these advancements in an efficient, cost-effective, and commercial manner.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A device for harvesting brine shrimp eggs from the surface of a body of water comprising:

a brine shrimp collector for removing and collecting brine shrimp eggs from the water surface comprising a conveyor system and a collection tank, wherein the conveyor system comprises:
- an inlet end extending into the body of water adjacent the floating layer of brine shrimp eggs;
- an outlet end extending above the body of water;
- a ramp surface located between the inlet end and the outlet end;
- a drive mechanism;
- a plurality of rigid impermeable scoops connected to the drive mechanism, said scoops being sized and configured about the drive mechanism to enter the water at the inlet end and to engage the ramp surface such that said scoops contain and transport a slurry of brine shrimp eggs along the ramp surface and deposit the eggs into the collection tank at the outlet end; and
- a conduit in fluid communication with the collection tank; and means for connecting the conduit to a pumping system for transporting brine shrimp eggs from collection tank to at least one porous storage container.

2. A device for harvesting brine shrimp eggs comprising:

means for concentrating brine shrimp eggs floating at the surface of a body of water;

a brine shrimp collector for removing and collecting brine shrimp eggs from the water surface comprising a conveyor system and a collection tank, wherein the conveyor system comprises:
- an inlet end extending into the body of water adjacent the floating layer of brine shrimp eggs;
- an outlet end extending above the body of water;
- a ramp having a ramp surface located between the inlet end and the outlet end;
- a drive mechanism; and
- a plurality of rigid impermeable scoops connected to the drive mechanism, said scoops being sized and configured about the drive mechanism to enter the water at the inlet end and to engage the ramp surface such that said scoops contain and transport a slurry of brine shrimp eggs along the ramp surface and deposit the eggs into the collection tank at the outlet end;

at least one porous storage container; and a pumping system for transporting the brine shrimp eggs from the brine shrimp collector to at least one porous storage container.

3. The brine shrimp egg harvesting device of claim 2, wherein the means for concentrating brine shrimp eggs comprises diverging, wedge-oriented booms defining a wide forward end and a narrow rearward end configured such that as the booms move forward in relation to the floating brine shrimp eggs, the eggs are received into the wide forward end and channeled into an increasingly narrow space until they are concentrated at the rearward end of the booms.

4. The brine shrimp egg harvesting device of claim 2, wherein the collection tank has at least one drain disposed within it adjacent the lowest point of the collection tank such that as the slurry of brine shrimp eggs and water fall into the collection tank, the slurry will flow through the drain by the force of gravity.

5. The brine shrimp egg harvesting device of claim 4, wherein the collection tank drain is connected to one end of a conduit, the other end of said conduit being connected to the pumping system.

6. The brine shrimp egg harvesting device of claim 2, wherein the collection tank is rigidly affixed to the conveyor system adjacent the outlet end such that as each scoop reaches the outlet end, the slurry of brine shrimp eggs and water contained by the scoop and the ramp surface flows out of each scoop into the collection tank.

7. The brine shrimp egg harvesting device of claim 2, wherein the collection tank is movably hinged to the ramp at the outlet end of the conveyor system and the inlet end is attached to at least one float, allowing the inlet end of the conveyor system to float independently of the collection tank.

8. The brine shrimp egg harvesting device of claim 2, wherein the collector further comprises means for adjusting the depth of the inlet end of the conveyor system below the water surface.

9. The brine shrimp egg harvesting device of claim 8, wherein the brine shrimp collector is pivotally mounted to a frame, and at least one longitudinally extendable and retractable ram is attached to the frame and to the collector such that the depth of the inlet end is pivotally adjustable in relation to the surface of the water.

10. The brine shrimp egg harvesting device of claim 9, wherein the frame has two sides, a substantially horizontal cross beam being movably secured to said sides such that the height of the frame, and consequently the brine shrimp collector, may be adjusted in relation to the water surface.

11. The brine shrimp egg harvesting device of claim 8, wherein the inlet end of the conveyor system is attached to one end of a longitudinally extendable and retractable ram, the other end of the ram being attached to a float allowing the depth of the inlet end to be adjusted in relation to the surface of the water.

12. The brine shrimp egg harvesting device of claim 2, wherein each scoop has a cavity defined by a generally concave trough and at least two cross panels configured generally perpendicular to the trough.

13. The brine shrimp egg harvesting device of claim 2, wherein each scoop has an outer longitudinal edge containing a flexible material for engaging the ramp surface to maintain uniform contact between the scoop and the ramp surface.

14. A device for harvesting brine shrimp eggs comprising:

means for concentrating brine shrimp eggs floating at the surface of a body of water, wherein the means for concentrating brine shrimp eggs comprises diverging, wedge-oriented booms defining a wide forward end and a narrow rearward end configured such that as the booms move forward in relation to the floating brine shrimp eggs, the eggs are received into the wide forward end and channeled into an increasingly narrow space until they are concentrated at the rearward end of the booms;

a brine shrimp collector for removing and collecting brine shrimp eggs from the water surface comprising:
- a collection tank, wherein the collection tank has at least one drain disposed within it adjacent the lowest point of the collection tank and wherein the collection tank drain is connected to one end of a conduit;
- a conveyor system comprising:
  - an inlet end extending into the body of water adjacent the floating layer of brine shrimp eggs;
  - an outlet end extending above the body of water;
  - a ramp having a ramp surface located between the inlet end and the outlet end;
  - a drive mechanism;
  - a plurality of rigid impermeable scoops connected to the drive mechanism, said scoops being sized and configured about the drive mechanism to enter the water at the inlet end and to engage the ramp surface such that said scoops contain and transport a slurry of brine shrimp eggs along the ramp surface and deposit the eggs into the collection tank at the outlet end, wherein each scoop has an outer longitudinal edge containing a flexible material for engaging the ramp surface to maintain uniform contact between the scoop and the ramp surface; and means for adjusting the depth of the inlet end of the conveyor system below the water surface;

at least one porous storage container; and a pumping system connected to the conduit for transporting the brine shrimp eggs from the brine shrimp collector to at least one porous storage container.

15. The brine shrimp egg harvesting device of claim 14, wherein the collection tank is rigidly affixed to the conveyor system adjacent the outlet end.

16. The brine shrimp egg harvesting device of claim 14, wherein the collection tank is movably hinged to the ramp at the outlet end of the conveyor system and the inlet end is attached to at least one float, allowing the inlet end of the conveyor system to float independently of the collection tank.

17. The brine shrimp egg harvesting device of claim 16, wherein the inlet end of the conveyor system is attached to one end of a longitudinally extendable and retractable ram, the other end of the ram being attached to a float allowing the depth of the inlet end to be adjusted in relation to the surface of the water.

18. The brine shrimp egg harvesting device of claim 14, wherein the brine shrimp collector is pivotally mounted to a frame, and at least one longitudinally extendable and retractable ram is attached to the frame and to the collector such that the depth of the inlet end is pivotally adjustable in relation to the surface of the water.

19. The brine shrimp egg harvesting device of claim 18, wherein the frame has two sides, a substantially horizontal cross beam being movably secured to said sides such that the height of the frame, and consequently the brine shrimp collector, is adjustable in relation to the water surface.

20. The brine shrimp egg harvesting device of claim 14, wherein the ramp surface is positioned beneath the plurality of rigid impermeable scoops connected to the drive mechanism.

* * * * *